US006206945B1

(12) United States Patent
Weiss, Jr. et al.

(10) Patent No.: US 6,206,945 B1
(45) Date of Patent: Mar. 27, 2001

(54) METHOD OF PRODUCING ARTIFICIAL GUANO

(76) Inventors: Charles Arthur Weiss, Jr., 315 Monterey Dr., Clinton, MS (US) 39056; Philip Garcin Malone, 107 Fox Run La., Vicksburg, MS (US) 39180

( * ) Notice: Subject to any disclaimer, the term of this patent is extended or adjusted under 35 U.S.C. 154(b) by 0 days.

(21) Appl. No.: 09/131,906

(22) Filed: Aug. 10, 1998

(51) Int. Cl.$^7$ ...................................................... C05F 3/00
(52) U.S. Cl. .................................... 71/21; 71/15; 426/55; 435/262
(58) Field of Search ................................... 71/11, 15, 21; 435/262, 41; 426/7, 55; 423/169

(56) References Cited

U.S. PATENT DOCUMENTS

| 3,684,476 | * | 8/1972 | Wadsted | ................................... 71/28 |
| 4,076,515 | * | 2/1978 | Rickard | ................................... 71/10 |
| 4,486,216 | | 12/1984 | von Raven et al. . | |
| 4,710,300 | * | 12/1987 | Kristoufek | .......................... 210/603 |
| 4,997,572 | | 3/1991 | Wurtz . | |
| 5,013,458 | * | 5/1991 | Christy, Sr. et al. | ................ 210/751 |
| 5,417,861 | * | 5/1995 | Burnham | ................................... 71/9 |
| 5,466,273 | | 11/1995 | Connell . | |
| 5,574,093 | * | 11/1996 | States, Sr. et al. | ............... 514/772.1 |

FOREIGN PATENT DOCUMENTS

| 1592736 | * | 2/1971 | (DE) | ......................................... 71/21 |
| 3446520 | * | 7/1986 | (DE) | ......................................... 71/21 |
| 149796 | * | 7/1985 | (EP) | ......................................... 71/21 |
| 61-232287 | * | 10/1986 | (JP) | ......................................... 71/21 |
| 4317485 | * | 11/1992 | (JP) | ......................................... 71/21 |

OTHER PUBLICATIONS

Lazell, E.W., "Hydrated Lime: History, Manufacture, Use in Plaster, Mortar, Concrete", p21–22 Dec. 1915.*

* cited by examiner

*Primary Examiner*—Gary Straub
(74) *Attorney, Agent, or Firm*—John MacEvoy

(57) ABSTRACT

High-nitrogen, high-phosphorus fertilizer is produced from animal wastes by mixing the waste with water and soft-burned dolomite, recovering ammonia that is liberated with an aqueous acidic medium, neutralizing the mixture, combining the ammonium salt recovered earlier with the mixture, the adding guano-forming bacteria to the mixture, and allowing the mixture to ferment.

18 Claims, No Drawings

METHOD OF PRODUCING ARTIFICIAL GUANO

GOVERNMENT INTEREST STATEMENT

The invention described herein may be manufactured, licensed, and used by or for governmental purposes without the payment of any royalties thereon.

BACKGROUND OF THE INVENTION

1. Field of the Invention

This invention relates to a process of producing a high-nitrogen, high-phosphorus fertilizer from animal wastes as well as a product of this process. Specifically, it relates to a process for treatment of animal wastes wherein nitrogen and phosphorus are retained and parasites and pathogenic bacteria are destroyed.

2. Prior Art

Present methods of composting animal wastes, e.g., poultry litter and cattle manure, tend to release nitrogen in the form of ammonia and create nuisance odors. Conventional composting allows the survival of parasites and pathogenic bacteria. Moreover, phosphates tend to leach away into the ground during conventional composting owing to their high solubility in water.

U.S. Pat. No. 4,486,216 discloses a process wherein fecal waste is treated with a smectite clay and lime by fermentation with aerobic and anaerobic microorganisms. U.S. Pat. No. 4,997,572 discloses a process wherein wastewater treatment sludge or animal wastes are treated with quicklime, with the loss of ammonia. U.S. Pat. No. 5,466,273 provides a process wherein organic wastes are treated with sulfuric acid and anhydrous ammonia, steam is introduced, and dolomite, potash, urea, and phosphate rock are added.

SUMMARY OF THE INVENTION

The method of the present invention overcomes the drawbacks of conventional composting. According to the method of this invention, the waste is mixed with soft-burned dolomite (calcium magnesium carbonate that has been calcined at approximately 900° C.). While soft-burned dolomite is preferred, any source of magnesium oxide is acceptable. The presence of magnesium is critical because of the formation of ammonium magnesium phosphate in the process, as explained below.

Water is added to a mixture of animal waste and calcined dolomite, principally CaO and MgO, whereby the heat of hydration of these oxides to the respective hydroxides is liberated and the mixture heats up to above 100° C. The strong alkalinity (pH>12.5) and elevated temperature of the mixture destroy parasites and undesirable bacteria in the animal waste. Ammonia that is emitted by the hot alkaline mixture is absorbed in a separate vessel in a dilute acidic medium, e.g., acetic, citric, nitric, sulfuric, or phosphoric acid, acid potassium phosphate or any other acidic salts that form ammonium salts. The mixture is allowed to cool to ambient temperature.

The mixture is neutralized by the introduction of carbon dioxide gas, whereby the pH is lowered. The ammonium salt recovered during the earlier evolution of ammonia is added back into the mixture. An inoculum of bacteria, such as a suspension of natural guano, is added to the mixture. The mixture is incubated in a closed vessel, whereby the mixture becomes anaerobic. The mixture is allowed to release carbon dioxide, whereby the pH rises. The solids of the mixture are recovered by drying, or filtration followed by drying of the filtercake. Any filtrate, since it contains some N and P, may be combined with a subsequent batch to preserve N and P values.

The process of this invention preserves nitrogen and phosphorus from the original waste in the form of relatively water-insoluble ammonium magnesium phosphate, which provides slow release of N and P into the ground when the product is used as fertilizer.

DETAILED DESCRIPTION OF THE INVENTION

Soft-burned dolomite for use in the process of this invention is prepared by calcination of finely-ground calcium magnesium carbonate at approximately 900° C. for about 30 minutes. A temperature range of 850–950° C. and a calcination time of 15 to 60 minutes is considered acceptable. The magnesium content of the calcined product ranges from 20 to 25 percent by weight. Soft-burned dolomite is the preferred source of magnesium oxide in this process, though other sources of magnesium oxide as well as higher calcination temperatures are acceptable.

The quantity of calcined dolomite mixed with the waste should exceed the stoichiometric requirements to form ammonium magnesium phosphate by about 10%. Poultry litter containing about 4% of nitrogen, or 40 parts of nitrogen, would require about 68 parts of Mg or 300 parts of calcined dolomite (about 22.5% Mg).

The water added to the mixture of waste and calcined dolomite should be sufficient to convert CaO and MgO to their respective hydroxides. The heat of hydration of CaO and MgO raises the temperature of the mixture above 100° C., undesirable microorganisms are destroyed, and ammonia is given off by the mixture. The ammonia is absorbed in a separate vessel in an aqueous solution of an acidic medium, e.g., acetic, citric, nitric, sulfuric or phosphoric acid, or any acid salts such as acid potassium phosphate.

The mixture is brought into contact with carbon dioxide. Calcium hydroxide reacts with the carbon dioxide to form calcium carbonate. Magnesium hydroxide, typically, does not react with carbon dioxide to form its carbonate. A solution of alkali metal stearate, e.g., sodium or potassium stearate, and stearic acid in water is added, forming a coating of calcium and magnesium stearate on the solid particles. Dilute acetic acid is added to selectively dissolve magnesium stearate to make magnesium ion available for the formation of ammonium magnesium phosphate as discussed below. The ammonium salt recovered as described above is now added back into the mixture. The pH is adjusted to 7 to 7.5 with a dilute acidic medium as enumerated above.

The treated mixture now is inoculated with a culture of bacteria such as, for example, a suspension of untreated natural guano in water, or with a small portion of artificial guano produced by the process of this invention in a previous batch. The inoculated mixture is allowed to ferment anaerobically in a closed vessel. Organic nitrogen compounds, primarily proteins, are broken down, releasing ammonia and phosphate to form ammonium magnesium phosphate, which is relatively water-insoluble, thus providing for the slow release of phosphorus and nitrogen to the soil when the artificial guano is used as fertilizer. Carbon dioxide buildup lowers the pH below 7. The partially fermented mixture now is brought in contact with the atmosphere, carbon dioxide gas escapes, and aerobic fermentation takes place with the pH rising to about 8.

The fermented suspension may be dried by evaporation of its water content. Optionally, the suspension may be filtered and the filtercake dried. Filtrate may be combined with the ingredients for the next batch to conserve N and P values in the filtrate.

While this invention has been described in terms of a specific embodiment, it is understood that it is capable of further modification and adaptation of the invention following in general the principle of the invention and including such departures from the present disclosure as come within the known or customary practice in the art to which the invention pertains and may be applied to the central features set forth, and fall within the scope of the invention and of the limits of the appended claims.

We claim:

1. A process for producing a slow release ammonium magnesium phosphate fertilizer from animal manure comprising
   a forming a mixture of animal manure and calcined soft burned dolomite, the dolomite being added in sufficient amount to raise the temperature of the mixture to above about 100° C. upon hydration and in excess of the amount necessary to react with the phosphate values present in the manure;
   b adding water to said mixture, wherein the calcined dolomite is hydrated and the temperature of the mixture raises to above about 100° C., thereby destroying parasites and undesirable bacteria, while ammonia is released from the mixture;
   c absorbing the ammonia in an aqueous acidic medium, forming an aqueous solution of an ammonium salt:
   d adjusting the pH of the mixture obtain in step b to about between 7.0 and 7.5;
   e inoculating the mixture obtained in step d with an aqueous suspension of natural guano and anaerobically fermenting the mixture to produce said fertilizer.

2. The process of claim 1 further comprising
   f forming a mixture of animal manure and calcined soft burned dolomite, the dolomite being added in sufficient amount to raise the temperature of the mixture to above about 100° C. upon hydration and in excess of the amount necessary to react with the phosphate values present in the manure;
   g adding water to said mixture, wherein the calcined dolomite is hydrated and the temperature of the mixture raises to above about 100° C., thereby destroying parasites and undesirable bacteria, while ammonia is released from the mixture;
   h absorbing the ammonia in an aqueous acidic medium, forming an aqueous solution of an ammonium salt:
   I adjusting the pH of the mixture obtained in step g to about between 7.0 and 7.5;
   j inoculating the mixture obtained in step I with an aqueous suspension of the fermentation product from step e and anaerobically fermenting the mixture to produce said fertilizer.

3. The process of claim 1 wherein the calcined dolomite was calcined at 850–950° C.

4. The process of claim 2 wherein the calcined dolomite was calcined at 850–950° C.

5. The process of claim 1 wherein the adjustment of the pH in step d is accomplished by bringing the mixture obtained in step b into contact with gaseous carbon dioxide.

6. The process of claim 2 wherein the adjustment of the pH in step h is accomplished by bringing the mixture obtained in step g into contact with gaseous carbon dioxide.

7. The process of claim 1 further comprising adding the aqueous solution obtained in step c to the mixture obtained in step d.

8. The process of claim 2 further comprising adding the aqueous solution obtained in step h to the mixture obtained in step g.

9. The process of claim 1 further comprising adding an alkali metal stearate and stearic acid to the mixture obtained in step b to form calcium and magnesium stearate, the magnesium stearate dissolving during the pH adjustment of step d.

10. The process of claim 2 further comprising adding an alkali metal stearate and stearic acid to the mixture obtained in step g to form calcium and magnesium stearate, the magnesium stearate dissolving during the pH adjustment of step I.

11. The method of claim 1 wherein the aqueous acidic medium used in step c is selected from the group consisting of acetic, nitric, sulfuric and phosphoric acids and acid potassium phosphate.

12. The method of claim 2 wherein the aqueous acidic medium used in step h is selected from the group consisting of acetic, nitric, sulfuric and phosphoric acids and acid potassium sulfate.

13. The process of claim 1 wherein the fermentation product of step e is an aqueous suspension, further comprising filtering the suspension and using the filtrate as a source of water for hydration of the dolomite.

14. The process of claim 2 wherein the fermentation product of step j is an aqueous suspension, further comprising filtering the suspension and using the filtrate as a source of water for hydration of the dolomite.

15. The process of claim 1 further comprising aerobically fermenting the product of step e.

16. The process of claim 2 further comprising aerobically fermenting the product of step I.

17. The process of claim 1 further comprising drying the product of step e.

18. The process of claim 1 further comprising drying the product of step j.

* * * * *